(12) United States Patent
Meyrahn et al.

(10) Patent No.: US 8,556,687 B2
(45) Date of Patent: Oct. 15, 2013

(54) METHOD AND SYSTEM FOR WEIGHING PRODUCTS

(75) Inventors: Joachim Meyrahn, Erzhausen (DE); Manfred Waldstädt, Mainz (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 228 days.

(21) Appl. No.: 12/896,321

(22) Filed: Oct. 1, 2010

(65) Prior Publication Data

US 2011/0081462 A1 Apr. 7, 2011

(30) Foreign Application Priority Data

Oct. 2, 2009 (EP) .................................... 09012518

(51) Int. Cl.
  *A22C 11/00* (2006.01)
  *A22C 11/12* (2006.01)
  *A22C 15/00* (2006.01)

(52) U.S. Cl.
  USPC .................. 452/31; 452/48; 452/51

(58) Field of Classification Search
  USPC .............................. 452/30–31, 35, 46–48, 51
  See application file for complete search history.

(56) References Cited

U.S. PATENT DOCUMENTS 3,115,668 A * 12/1963 Townsend ........................ 452/45
4,091,505 A * 5/1978 Muller et al. .................... 452/47
4,370,779 A * 2/1983 Meier .............................. 452/31
4,417,368 A * 11/1983 Washburn ........................ 452/34
4,539,796 A * 9/1985 Nakamura et al. .............. 452/40
4,766,645 A * 8/1988 Lamartino et al. .............. 452/31
4,771,510 A * 9/1988 Kawai .............................. 452/35
4,847,951 A * 7/1989 Kollross .......................... 452/48
5,083,970 A * 1/1992 Reutter ............................ 452/30
5,092,813 A * 3/1992 Kasai et al. ..................... 452/46

(Continued)

FOREIGN PATENT DOCUMENTS

DE          19519394 A1    11/1996
DE    10 2005 044 877 A1    3/2009

(Continued)

OTHER PUBLICATIONS

Abstract and Machine Translation of EP 2008522 (A1) obtained from http://worldwide.espacenet.com on Oct. 6, 2011, 10 pgs.

(Continued)

*Primary Examiner* — David Parsley
(74) *Attorney, Agent, or Firm* — Hahn Loeser & Parks LLP

(57) ABSTRACT

The invention relates to a system for producing and handling sausage-like product and a method for controlling for controlling said system with the steps of filling a tubular casing with viscous or granular stuff, dividing the filled tubular casing into sausage-like products and closing the sausage-like products by closure clips in a clipping machine, feeding the sausage-like product out of the clipping machine and storing the sausage-like product on a rod-like element in a hanging line and gripping the rod-like element by a robotic device and storing the rod-like element in a storage frame. The method further comprises the steps of sensing the weight of the sausage-like product after the sausage-like product is stored on a rod-like element, deriving a control signal for the clipping machine on the basis of the weight and controlling the clipping machine by a control unit on the basis of the control signal.

5 Claims, 3 Drawing Sheets

(56) References Cited

U.S. PATENT DOCUMENTS

Figure 1:
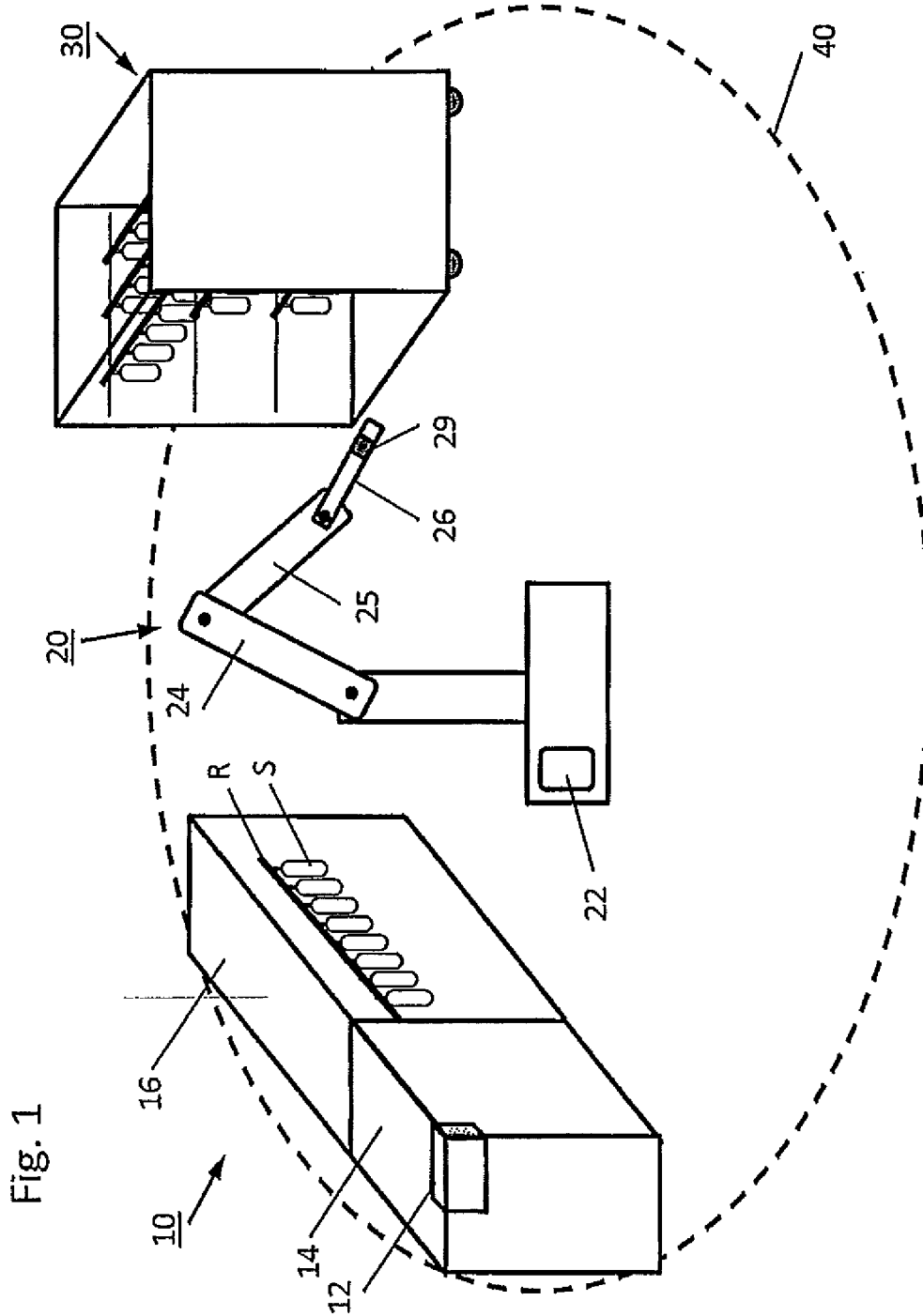

| | | | |
|---|---|---|---|
| 5,100,364 A | | 3/1992 | Kollross et al. |
| 5,743,792 A | | 4/1998 | Hanten et al. |
| 5,842,914 A | | 12/1998 | Vermeer et al. |
| 5,951,391 A | * | 9/1999 | Hergott et al. ............. 452/46 |
| 6,056,635 A | | 5/2000 | Vermeer et al. |
| 7,614,942 B2 | | 11/2009 | Liermann et al. |
| 7,766,729 B2 | | 8/2010 | Liermann et al. |
| 2007/0180795 A1 | | 8/2007 | Topfer |
| 2009/0011695 A1 | * | 1/2009 | Liermann et al. ............. 452/186 |

FOREIGN PATENT DOCUMENTS

| | | | |
|---|---|---|---|
| EP | 0424675 | A1 | 5/1991 |
| EP | 1 763 999 | A1 | 3/2007 |
| EP | 1891858 | A1 | 2/2008 |
| EP | 1985183 | A1 | 10/2008 |
| EP | 1994829 | A1 | 11/2008 |
| EP | 2008522 | A1 | 12/2008 |
| WO | 9605733 | | 2/1996 |

OTHER PUBLICATIONS

Abstract and Machine Translation of EP 0424675 (A1) obtained from http://worldwide.espacenet.com on Oct. 6, 2011, 7 pgs.

Abstract and Machine Translation of EP 1994829 (A1) obtained from http://worldwide.espacenet.com on Oct. 6, 2011, 11 pgs.

Abstract and Machine Translation of EP 1891858 (A1) obtained from http://worldwide.espacenet.com on Oct. 6, 2011, 7 pgs.

Abstract and Machine Translation of EP 1985183 (A1) obtained from http://worldwide.espacenet.com on Oct. 6, 2011, 9 pgs.

Abstract and Machine Translation of DE 19519394 (A1) obtained from http://worldwide.espacenet.com on Oct. 6, 2011, 6 pgs.

EP 1 763 999 A1—English abstract and machine translation obtained from Espacenet (http://worldwide.espacenet.com) accessed on Apr. 24, 2012, 9 pages.

DE 10 2005 044 877 A1—English abstract obtained from Espacenet (http://worldwide.espacenet.com) accessed on Apr. 24, 2012, 1 page.

* cited by examiner

METHOD AND SYSTEM FOR WEIGHING PRODUCTS

This patent application claims priority to and the benefit of European patent application EP 09 012 518.8-2313, filed Oct. 2, 2009, which is hereby incorporated herein by reference.

The present invention relates to a system for producing sausage-like products according to the preamble of claim 1.

In particular, the present invention relates to a method for controlling a system for producing sausage-like products with the steps of providing a tubular casing, filling the tubular casing with viscous or granular stuff, dividing the filled tubular casing into sausage-like products and closing the sausage-like products by closure clips in a clipping machine, feeding at least one sausage-like product out of the clipping machine and storing the sausage-like product on a rod-like element in a hanging line, gripping the rod-like element by a robotic device and storing the rod-like element in a storage frame. Furthermore, the invention relates to a system for producing sausage-like products. The system comprises a filling machine for filling a tubular casing with viscous or granular stuff, a clipping machine for dividing the filled tubular casing into sausage-like products and closing the sausage-like products, a transportation device for feeding the sausage-like products out of the clipping machine and for storing the sausage-like products on rod-like elements, a hanging line for accommodating the rod-like elements and a robotic device for gripping the rod-like elements and a control unit for controlling the system.

From patent application DE 10 2005 044 877, a device and a method for producing sausage-like products are already known, wherein a filling tube is provided for feeding a packing material or tubular casing, respectively, with, for example, sausage meat wherein the tubular casing is closed at one end facing in the filling direction by a first clip. After the filling operation is concluded, the tube-like casing is finally closed. If the sausage product is later to be hung up, for example for the purposes of smoking or storage, a suspension loop is fed thereto in such a way that, when the clip is fitted, it is embraced by the clip and is thus secured to the sausage-like product. The term loops in accordance with this invention is used to denote all at least partially flexible means, by way of which articles can be hung up.

Furthermore, to produce sausage-like products of equal length, in the German patent 195 19 394, a method and a device for producing sausage-like products is disclosed, wherein the tube-like casing material is provided with marks, like pictures or labels in predetermined regular intervals according to the length of the sausage-like product to be produced. Said marks are detected by a respective sensor, which controls the clipping machine. Sausage-like products are fed out of the clipping machine by a first transportation device, like a belt-conveyor. An additional conveyor, arranged subsequently to the first band-conveyor, includes a weighing cell for sensing the weight of the sausage-like product. The sensor of the weighing cell is coupled to the casing breaking device. In the case that the weight of the sausage-like product falls under a predetermined value, breaking force of the casing breaking device will be increased, whereby more filling material, like sausage meat, is filled into the casing material. Since the length of the sausage-like product remains equal, its weight increases. In case that the weight of a sausage-like product is higher than a predetermined value, the breaking force of the casing breaking device is lowered and the weight of the subsequent sausage product will decrease.

In the production of sausage-like products, sausage producing machines as described above may be part of a system, wherein an automatic hanging line is directly attached to the sausage producing machine. Sausage-like products fed out of the clipping machine are automatically caught by their suspension loop and hung up on rod-like elements like smoking rods. Said systems are of high productivity, which is normally reached by a high production rate. Accordingly, a conveyor including a weighing device has to be operated at a high speed, which may lead to an imprecise weighing result. On the other hand, the conveyor including the weighing device is an additional device in the sausage production system. The conveyor needs to be of a maximum length according to the length of the largest sausage product, which may be produced at the sausage producing machine. Otherwise, the length of the sausages which can be produced, is limited by the length of the conveyor.

Therefore, it is an object of the invention to provide a system for producing sausage-like products and a method for controlling the system, with which the above mentioned drawbacks can be overcome and with which sausage-like products of predetermined dimensions may be produced with high productivity.

The aforesaid object with respect to the system is achieved by the features of claim 1. Advantageous configurations of the invention regarding the system are described in claims 2 to 5.

In the present invention, the method for controlling a system for producing sausage-like product comprises the steps of providing a tubular casing, filling the tubular casing with viscous or granular stuff, dividing the filled tubular casing into sausage-like products and closing the sausage-like products by closure clips in a clipping machine, feeding at least one sausage-like product out of the clipping machine and storing the sausage-like product on a rod-like element in a hanging line, gripping the rod-like element by a robotic device and storing the rod-like element in a storage frame.

In an advantageously configuration the method for controlling the system includes the steps of sensing the weight of the sausage-like product after the sausage-like product is stored on the rod-like element, deriving a control signal for at least the clipping machine on the basis of the weight of the sausage-like product and controlling at least the clipping machine on the basis of the control signal. This configuration allows a reliable sensing of the weight of the sausage-like product by a high production rate and a rapid adaptation of the weight of the sausage-like product to a predetermined value.

In a preferred embodiment, the sum of weights of all sausage-like products actually stored on the rod-like element is sensed. Based on this value and the number of sausage-like products actually stored on said rod-like element the weight of single sausage-like product may be calculated. This allows determining the weight of the actually produced sausage-like product as well as the average weight of all sausage-like products actually hanging on the rod-like element. A drift in altering of the weight may be detected and a proper reaction can be caused to the clipping machine.

The accuracy of the weight of the sausage-like product may be raised by sensing the weight of the rod-like element before or after inserting the rod-like element into the respective holding elements of the hanging line for sensing the tare weight of the rod-like element.

In the case that the rod-like element for storing the sausage-like product is clamped inside the automatic hanging line only on one end, the weight of a sausage-like product stored on the rod-like element may advantageously be derived from the lever principle. It is in principle also possible to determine the weight of a sausage-like product by the lever principle if the rod-like element is borne on both of its ends. In such a case, the one end of the rod-like element is borne, for example, on a plane-like element whereas the other end is held by a clamping unit which is provided with a sensing unit.

In an alternate or additional configuration of the system, the weight of a sausage-like product may be sensed before the sausage-like product is stored on the rod-like element. The weighing cell may be integrated in the hook on which the sausage-like product is hanging to be transferred to the rod-like element.

In a preferred embodiment of the method according to the present invention, a tendency for the development of the weight of the sausage-like products is derived on the basis of the weights of the single sausage-like products. Based on said tendency, the control unit can act on e.g. the clipping machine for vary the size of the sausage-like product, even if its weight is still inside a predefined range of weight. Thereby losses due to oversized or undersized sausage-like products may be reduced.

For further raising the accuracy of the dimensions of the sausage-like product, additional parameters may be sensed and the control signal for the clipping machine is derived on the basis of the weight and the additional parameters. Said additional parameters may be the length or the diameter of the sausage-like product, which may be detected by additional sensor devices comprising light beams or movement sensors.

For security aspects, additional control signals may be computed and outputted by the control unit to the filling machine and/or the robotic device. Said signals may characterize various error conditions and may cause the filling machine and/or the robotic device to an adequate reaction, like an emergency stop or a reduced production rate.

According to the present invention, the system for producing sausage-like product comprises a filling machine for filling a tubular casing with viscous or granular stuff, a clipping machine for dividing the filled tubular casing into sausage-like products and closing the sausage-like products, a transportation device for feeding at least one sausage-like product out of the clipping machine and for storing the sausage-like product on a rod-like elements, a hanging line for accommodating the rod-like elements, a robotic device for gripping the rod-like elements and a control unit for controlling the system.

For executing the above described method, the system according to the present invention comprises a sensing device for sensing the weight of at least one of the sausage-like product, the sensing device is coupled to the control unit and the control unit comprises a computing element for computing and outputting a control signal for at least the clipping machine on the basis of the weight of the at least one sausage-like product.

In a preferred embodiment of the system, the sensing device is coupled to at least one of the holding elements of the rod-like elements. In this configuration, the weight of an empty rod-like element inserted into the automatic hanging line may be sensed as well as the weight of the sausage-like product actually hung up to the rod-like element.

In the case that the rod-like element is clamped only on one end inside the automatic hanging line, the sensing device is coupled to the clamping element. Accordingly, in the case that the rod-like element is borne on both of its ends, the one end of the rod-like element is borne, for example, on plane-like element whereas the other end is held by a clamping unit which is provided with a sensing unit. Additionally or alternatively, the plain-like element may also be provided with a sensing element.

The sensing element of the plain-like element and the sensing unit provided with the clamping unit may form a common sensing device. It may be advantageously that the transportation device alternatively or additionally comprises a sensing device for sensing the weight of the sausage-like product while fed to the rod-like element. Said sensing device may be coupled to a hook element in the automatic hanging line for transferring the sausage-like product to the rod-like element.

In the case that the robotic device comprises a sensing device, the weight of the rod-like element together with the weight of the sausage-like products hanging thereon may be sensed.

The control unit advantageously comprises a computing element for computing and outputting a control signal for the filling machine and/or the robotic device.

The features of the system according to the present invention provide the same advantages as described in conjunction with the inventive method.

Further advantages and a preferred embodiment will be described in the following together with the drawings listed below. The expressions "left", "right", "below" and "above" are referred to the drawings in an alignment such that the reference numbers used can be read in normal.

Figure 2:
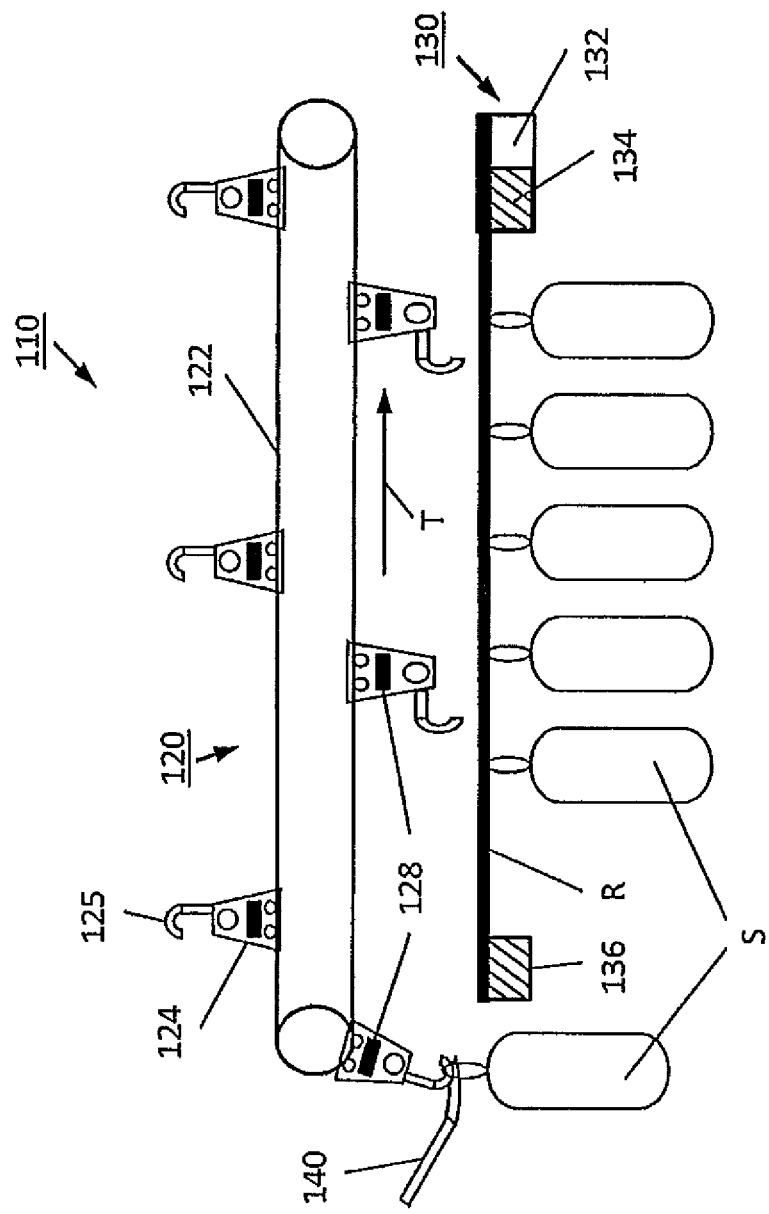
Figure 3:
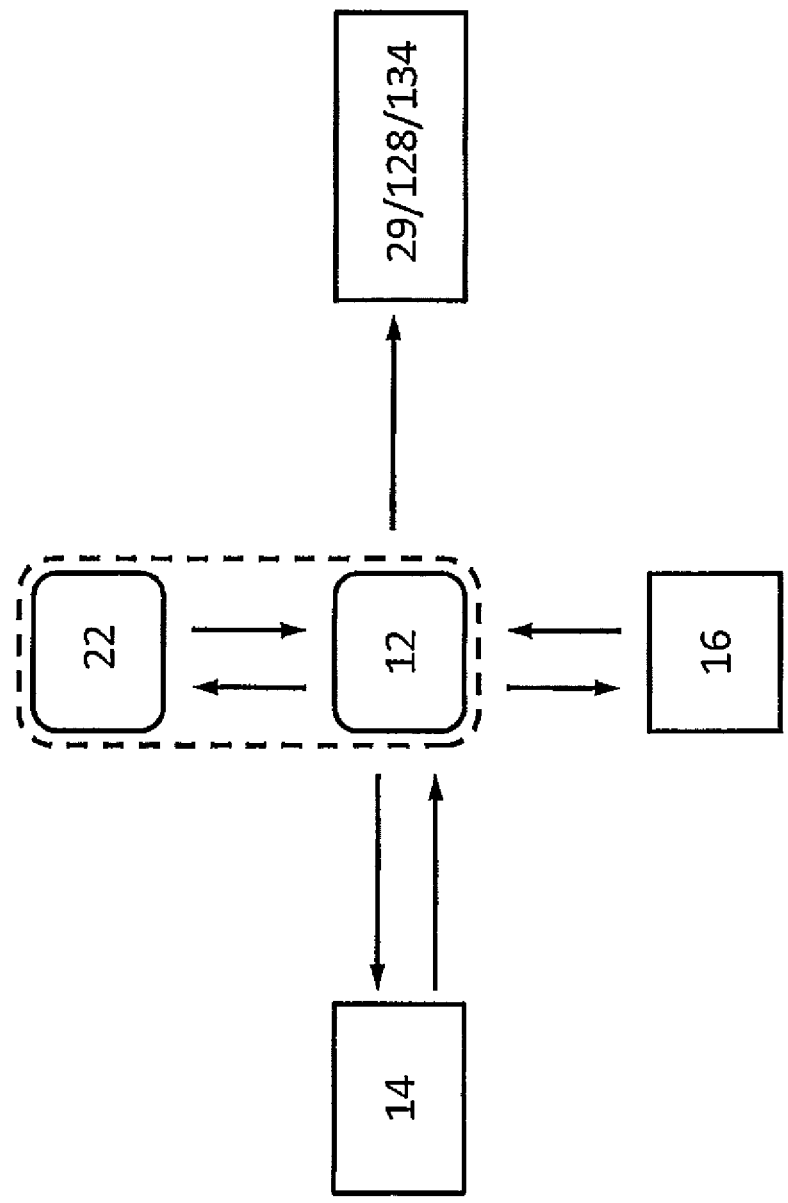

In the drawings:

FIG. 1: is a schematically view of a system for producing and handling sausage products including a controlling system according to the present invention; and FIG. 2: is a schematically view of an automatic hanging line in the system according to FIG. 1 including sensing devices according to the present invention; and FIG. 3: is a schematically diagram of the control system according to the present invention.

According to FIG. 1, the system for producing and handling sausage-like products S, e.g. sausages S comprises as main components a schematically shown production unit 10 for producing sausages S and storing them on rod-like elements R, e.g. smoking bars, a robotic device 20 having a control unit 22 for controlling the movement of robotic device 20 and a storage frame 30, into which the sausages S hung up at the smoking rods R are to be moved.

Production unit 10 comprises a control unit 12, a sausage production device 14 and an automatic hanging line 16. At least automatic hanging line 16 is peripherally arranged inside an operation range 40 of robotic device 20 described below. In production unit 10, sausages S are produced in a known manner by filling sausage meat through a filling pipe into a tubular casing and closing the casing by a clipping machine attaching and closing clips at both ends. A flexible suspension loop is fed to one of the closing clips to be attached together with said clip to the respective end of the sausages S. Thereafter sausages S will be placed in regular intervals at smoking rod R in automatic hanging line 16.

Robotic device 20 is positioned in the centre of its operation range 40 to reach all units and stations peripherally arranged inside operation range 40 by its pivotally attached arms 24, 25. At front end of arm 25, a gripping unit 26 is arranged for gripping the rod-like element R with the sausage products S hanging thereon inside production unit 10, in particular from hanging line 16, and moving it to a movable storage frame 30.

Storage frame 30 is positioned in operation range 40 of robotic device 20. Inside storage frame 30 tray rails e.g. in the form of horizontally aligned bars are arranged for positioning smoking rods R thereon.

In FIG. 2, an automatic hanging line 110 is schematically and partially shown. Amongst others, said hanging line 110 comprises a transportation device in the form of a horizontally arranged conveyor 120 and a clamping device 130 for clamping a smoking rod R on which sausages S are to be hung up.

Conveyor 120 includes a conveyor belt or chain 122 on which hook elements 124 are arranged in regular intervals. Conveyor chain 122 circulates about two turning points in a direction identified by arrow T. Hooks 125 of hook elements 124 at the carrying side of chain 122 are in a delivering position, where hooks are pivoted into a approximately horizontal position parallel to chain 122. Hooks 125 of hook elements 124 at the return side of chain 122 are in a receiving position, where hooks 125 are perpendicularly aligned to chain 122.

Below conveyor chain 122, a smoking rod R is arranged parallel to conveyor chain 122 and in a distance which corresponds almost to the vertical height of a hook element 124. Smoking rod R is held by a holding device 130 at its right end. Holding device 130 comprises an only schematically shown clamping unit 132, which may be known in the art. Holding device 130 further comprises a sensing unit 134, which may be a weight sensing unit comprising a suitable sensor element, like a pressure sensor or a strain gauge. At the left end of smoking bar R, a further bearing 136 for smoking bar R is shown so that smoking bar R is borne on both ends. It is principle possible to hold smoking bar R only on one end, for example, the right end by a respective clamping unit.

In the region of the left end of smoking rod R, a delivery element 140 is arranged. Delivery element 140 is part of the mechanism for feeding an actually produced sausage S out of the clipping machine, which is not shown and which may also be known in the art. Delivery element 140 is arranged to be passed by a hook element 124, whereby a sausage S positioned in delivery element 140 is caught by hook element 124.

FIG. 3 is a schematically diagram of the control system according to the present invention, on the basis of which the function of the inventive control method will be described.

Sausage production device 14 comprises a filling pipe on which a tubular casing for the sausage S is stored. The tubular casing is closed at its front end at the opening of the filling pipe by a closing clip constituting the first end of the sausage S. Filling material like sausage meat is filled into the casing via the filling pipe. If a predetermined length of the sausage S is reached, the clipping machine gathers the filled casing, whereby a plat free from sausage meat is provided, and stacks at least one clip at the plate for closing the second end of the sausage S. Together with the clip, a flexible hanging means, like a loop, is secured to the second end of the sausage product S for hanging up the sausage product S thereon. At the same time, a second clip may be stack and closed around to the plait, constituting the first end of the subsequent sausage S.

Alternatively to the length of the sausage S, the size of the sausage meat portion filled into the casing may be predetermined or the duration of the filling process.

Upon closing the tubular casing and securing a loop to the second end of the sausage S, the sausage meat free plait is cut between the second clip of the sausage S and the first clip of the first end of the subsequent sausage S. The actually produced sausage is than fed out of the clipping machine by a suitable conveyor like a belt conveyor. The loop is thereby caught by a guide for placing the sausage S at delivery element 140.

Conveyor 120 turns in the direction T, whereby a hook element 124 passes delivery element 140. Hook 125 of hook element 124 engages the loop of sausage S and transfers sausage S to smoking rod R. At a predetermined position, hook 125 is pivoted from the receiving position into the delivering position (the receiving position of a hook element 124 is shown with the left lower hook element 124, whereas the delivery position of a hook element 124 is shown with the middle lower and right hook elements 124). Thereby the sausage S is placed on smoking rod R. After passing the second turning point, which is the right one in FIG. 2, hook element 124 enters the return side, whereby hook 125 is pivoted into the receiving position.

The sausage S actually placed on smoking rod R causes a force to smoking rod R. Said force is detected by sensing unit 134 in holding device 130. Based on the distance between sausage S and sensing unit 134, the weight of sausage S is calculated according to the lever principle in a respective calculation device in control unit 12 of sausage production unit 10.

The lever principle allows calculating the weight of a sausage S from its known distance to the sensing unit 134, which in this case is the "lever", and the force acting on sensing device 134 via the moment caused by the weight of the sausage S and the length of the "lever".

According to the result of said calculation, the size of the actually produced sausage S or the subsequent sausage S may be altered. If the calculated weight exceeds a predetermined value, the length of the following sausages S may be reduced. Alternatively, the duration of the filling process may be reduced or a smaller amount of sausage meat is filled into the casing.

The calculation device of control unit 12 calculates the weight of the sausage S actually hung up on smoking rod R and, in the case that the weight of the sausage S exceeds or falls under a predetermined threshold value, control unit 12 acts on the clipping machine and/or the pump of the filling machine and/or other suitable devices, like the casing breaking device, for altering the weight of the sausage S still to be produced.

It is also possible to calculate the sum of the weight of all sausages S hanging on smoking rod R, on the basis of which an average weight of each of the sausages S hanging on smoking rod R can be calculated.

For raising the accuracy of the calculated weight of the sausages S, the weight of smoking rod R is calculated before a sausage S is hung up on smoking rod R. The so calculated tare weight of smoking rod R is included into the calculation of the weight of the sausages S. The weight of smoking rod R can be calculated inside automatic hanging line 16 just before the first sausage S is hung up on smoking rod R. Alternatively, weight of smoking rod R can be measured before smoking rod R is inserted into aromatic hanging line 16, e.g. in a not shown smoking rod supply.

Since, the weight of each of the sausage S is determined, a tendency for the further development of the weights of the sausages S may be derived from said determined weights. Accordingly, control unit 12 may act on the respective devices already before the weight of the sausages S fall under or exceed a predetermined threshold value.

After a certain number of sausages S has been placed on smoking rod R, a respective signal is sent from control unit 12 of sausage production device 10 to control unit 22 of robotic device 20. Robotic device 20 controlled by control unit 22, is moved towards automatic hanging line 16 and grips a smoking rod R. For gripping a smoking rod R, at the front end of arm 25 of robot device 20, a gripping unit 26 is arranged. Gripping unit 26 may comprise at least one jaw for gripping a smoking rod R. In a simplified embodiment, gripping unit 26 may only provided with hook-like elements, in which a smoking rod R rests.

Robotic device 20, which may be a so called joined-arm robot, removes a smoking rod R together with the sausage products S hanging thereon from automatic hanging line 16 and moves it towards storage frame 30. Smoking rods R will be placed at predetermined positions on the tray rails inside storage frame 30 according to the size of the sausage products S.

In FIG. 2, a further embodiment for detecting the weight of a sausage S is shown and will be described below. It has to be noted that, although it is shown in conjunction with the weight sensing unit 134, it can be used independently from said weight sensing unit 134.

As it can be seen in FIG. 2, sensing elements 128 are provided at hook elements 124. Said sensing elements 128 may be comprise strain gauges. In the time between the sausage S is caught by hook element 124 and the moment, hook element 124 reaches the predetermined delivery position for delivering the sausage S to smoking rod R, sensing element 128 is strained by the weight of the sausage S. The sensed load on sensing element 128 corresponds to the weight of sausage S hanging on hook 125. At each hook element 124, sensing element 128 can be coupled via not shown control unit for receiving weight signal from strain gauge 128 to an also not shown transmitter for sending the weight signal to a respective receiver connected to control unit 12. The sensed load is transmitted to control unit 12, where the weight of the sausage S is calculated.

The weight of sausages S, calculated on the basis of sensing elements 128, may provide a more exact result, since each single sausage S is weighed instead of all sausages S actually hanging on smoking rod R. Since sensing elements 128 are be moved together with hook elements 124, a connection between sensing elements 128 and control unit 12 by wire is not easy to achieve which, however, is in principle possible. Thus, it is advantageous to provide sensing elements 128 with wireless transmitter, e.g. based on RFID technology, as already described above.

As also already mentioned above, sensing elements 128 at hook elements 124 may replace sensing element 134 provided in holding device 130. It is also possible to maintain both sensing elements 128, 134. In this case, a balancing of the results of sensing elements 128, 134 may be executed to increase the accuracy of the weighing result.

A further alternative or additional embodiment for sensing and calculating weight of sausages S will be described below in conjunction with FIG. 1. The robotic device according to FIG. 1 further comprises an additional sensing element 29, which is attached to the gripping unit 26. Each time, gripping unit 26 has caught a smoking rod R filled with sausages S from automatic hanging line 16 and moves smoking rod R towards storage device 30, the weight of smoking rod R together with sausages S act on gripping unit 26. Sensing element 29 at gripping unit 26 senses a respective load on gripping element 26 and transmits the result to control unit 12 of sausage production unit 10, where the weight of smoking rod R and the sausages S hanging thereon is calculated. For transmitting signals from sensing element 29 to control unit 12, a connection may be established by wire or wireless, e.g. based on RFID technology.

For security reason, it is possible to derive safety signals from sensing elements 29, 128, 134, e.g. in the case that the weight of a sausage S exceeds a maximum value, falls under a minimum value or the all up weight of the smoking rod R including all sausages S hanging thereon falls under a minimum value or exceeds a maximum value. In that case, a weighing error has been occurred and the sausage production may be stopped by control unit 12.

To rise up the productivity and to reduce costs, the present system for producing sausage-like products S may be simplified by merging control units 12 and 22 into a common control unit as shown in FIG. 3 in dashed line. Said single control unit allows an easier and effective data input and a connection between control units 12 and 22, e.g. by wire, will be redundant.

The invention claimed is:

1. A system for producing sausage-like products comprising:
   a filling machine for filling a tubular casing with viscous or granular stuff;
   a clipping machine for dividing the filled tubular casing into sausage-like products and closing the sausage-like products;
   a transportation device for feeding at least one sausage-like product out of the clipping machine and for storing the sausage-like product on a rod-like elements;
   a hanging line for accommodating the rod-like elements; a robotic device for gripping the rod-like elements;
   a control unit for controlling the system; and,
   a sensing device for sensing the weight of at least one of the sausage-like products, the sensing device being coupled to the control unit and wherein the control unit comprises a computing element for computing and outputting a control signal for at least the clipping machine on the basis of the weight of the at least one sausage-like product.

2. The system according to claim 1, wherein the hanging line comprises holding elements and the sensing device is coupled to at least one of the holding elements.

3. The system according to claim 1, wherein the transportation device comprises a sensing device for sensing the weight of the sausage-like product while fed to the rod-like element.

4. The system according to claim 1, wherein the robotic device comprises a sensing device.

5. The system according to claim 1, wherein the control unit comprises a computing element for computing and outputting a control signal for the filling machine and/or the robotic device.

* * * * *